(12) United States Patent
Nakajima et al.

(10) Patent No.: US 12,537,424 B2
(45) Date of Patent: Jan. 27, 2026

(54) INVERTER-INTEGRATED MOTOR

(71) Applicant: Nissan Motor Co., Ltd., Kanagawa (JP)

(72) Inventors: Masaya Nakajima, Kanagawa (JP); Yoshiyuki Sakai, Kanagawa (JP); Seiichi Sato, Kanagawa (JP); Kouki Matsumura, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 237 days.

(21) Appl. No.: 18/254,276

(22) PCT Filed: Nov. 25, 2020

(86) PCT No.: PCT/IB2020/000933
§ 371 (c)(1),
(2) Date: May 24, 2023

(87) PCT Pub. No.: WO2022/112828
PCT Pub. Date: Jun. 2, 2022

(65) Prior Publication Data
US 2024/0014715 A1    Jan. 11, 2024

(51) Int. Cl.
*H02K 11/33* (2016.01)
*H02K 3/50* (2006.01)
(Continued)

(52) U.S. Cl.
CPC ............... *H02K 11/33* (2016.01); *H02K 3/50* (2013.01); *H02K 5/20* (2013.01); *H02K 11/27* (2016.01);
(Continued)

(58) Field of Classification Search
CPC .... H02K 2203/09; H02K 11/27; H02K 11/33; H02K 11/30; H02K 2211/03
See application file for complete search history.

(56) References Cited

U.S. PATENT DOCUMENTS

| 6,091,174 A | 7/2000 | Genster |
| 10,361,608 B2 | 7/2019 | Hasegawa |

(Continued)

FOREIGN PATENT DOCUMENTS

| JP | 2007116840 A | * | 5/2007 |
| JP | 2015-089298 A | | 5/2015 |

(Continued)

OTHER PUBLICATIONS

JP2007116840A Translation (Year: 2007).*

*Primary Examiner* — Oluseye Iwarere
*Assistant Examiner* — Nicholas Lee Setzer
(74) *Attorney, Agent, or Firm* — Osha Bergman Watanabe & Burton LLP

(57) ABSTRACT

An inverter unit at an end portion of a motor in a rotation shaft direction, the motor includes a conductive member electrically connected to the inverter unit, the inverter unit includes a control component connected to the conductive member and configured to control driving of the motor, the conductive member extends from the end portion of the motor along a rotation shaft of the motor in a state of being adjacent to the rotation shaft, and the control component is disposed on a radially outer side of the conductive member.

6 Claims, 6 Drawing Sheets

(51) Int. Cl.
*H02K 5/20* (2006.01)
*H02K 11/27* (2016.01)
(52) U.S. Cl.
CPC ...... *H02K 2203/09* (2013.01); *H02K 2211/03* (2013.01)

(56) References Cited

U.S. PATENT DOCUMENTS

| | | | | |
|---|---|---|---|---|
| 2015/0231975 | A1* | 8/2015 | Ishii | B60L 50/13 307/10.1 |
| 2018/0152079 | A1* | 5/2018 | Hasegawa | H02K 11/33 |
| 2018/0215271 | A1* | 8/2018 | Nakayama | B60L 7/16 |
| 2022/0142014 | A1* | 5/2022 | Ono | H02B 1/48 361/699 |
| 2022/0185363 | A1* | 6/2022 | Suzuki | H02K 11/33 |
| 2023/0059509 | A1* | 2/2023 | Mima | H02M 7/003 |
| 2023/0318387 | A1* | 10/2023 | Motoishi | H02K 11/0141 310/71 |

FOREIGN PATENT DOCUMENTS

| | | |
|---|---|---|
| JP | 2018-078718 A | 5/2018 |
| JP | 2019-195244 A | 11/2019 |

* cited by examiner

INVERTER-INTEGRATED MOTOR

TECHNICAL FIELD

The present invention relates to an inverter-integrated motor.

BACKGROUND ART

An inverter-integrated motor in which a motor and an inverter are integrally formed is known.

JP2015-089298A discloses an inverter-integrated motor in which an inverter is provided in the vicinity of a motor, and a motor case and an inverter case are disposed adjacent to each other in an axial direction.

SUMMARY OF INVENTION

In the related art, a motor coil wire (bus bar) that electrically connects a motor and an inverter is disposed on an outer peripheral side of the inverter, and components of the inverter are disposed inside the bus bar. With such a configuration, the components of the inverter are restricted in size. For example, when output and withstand voltage of the inverter are increased in order to increase output of the motor, the components are increased in size, but the components cannot be expanded in a radial direction due to the presence of the bus bar, and are expanded in a rotation shaft direction. Therefore, there is a problem that it is difficult to reduce the size of the components in the rotation shaft direction when the output of the motor is increased.

The present invention is made in view of such a problem, and an object of the present invention is to provide an inverter-integrated motor that can be decreased in size in a rotation shaft direction even when output of a motor is increased.

According to an aspect of the present invention, an inverter unit at an end portion of a motor in a rotation shaft direction, the motor includes a conductive member electrically connected to the inverter unit, the inverter unit includes a control component connected to the conductive member and configured to control driving of the motor, the conductive member extends from the end portion of the motor along a rotation shaft of the motor in a state of being adjacent to the rotation shaft, and the control component is disposed on a radially outer side of the conductive member.

According to the present invention, a conductive member connecting the motor and an inverter is disposed adjacent to a rotation shaft, and a control component of an inverter unit is disposed on a radially outer side of the conductive member, and thus the control component can be expanded toward the radially outer side. For example, even when the control component is increased in size due to the increase of output and withstand voltage of the control component in order to increase the output of the motor, an increase in a size of the control component in a rotation shaft direction can be prevented by increasing a size of the control component in a radial direction. Therefore, when the output of the motor is increased, the size of the control component in the rotation shaft direction can also be decreased.

DESCRIPTION OF EMBODIMENTS

Hereinafter, embodiments of the present invention will be described with reference to the drawings or the like.

Figure 1:
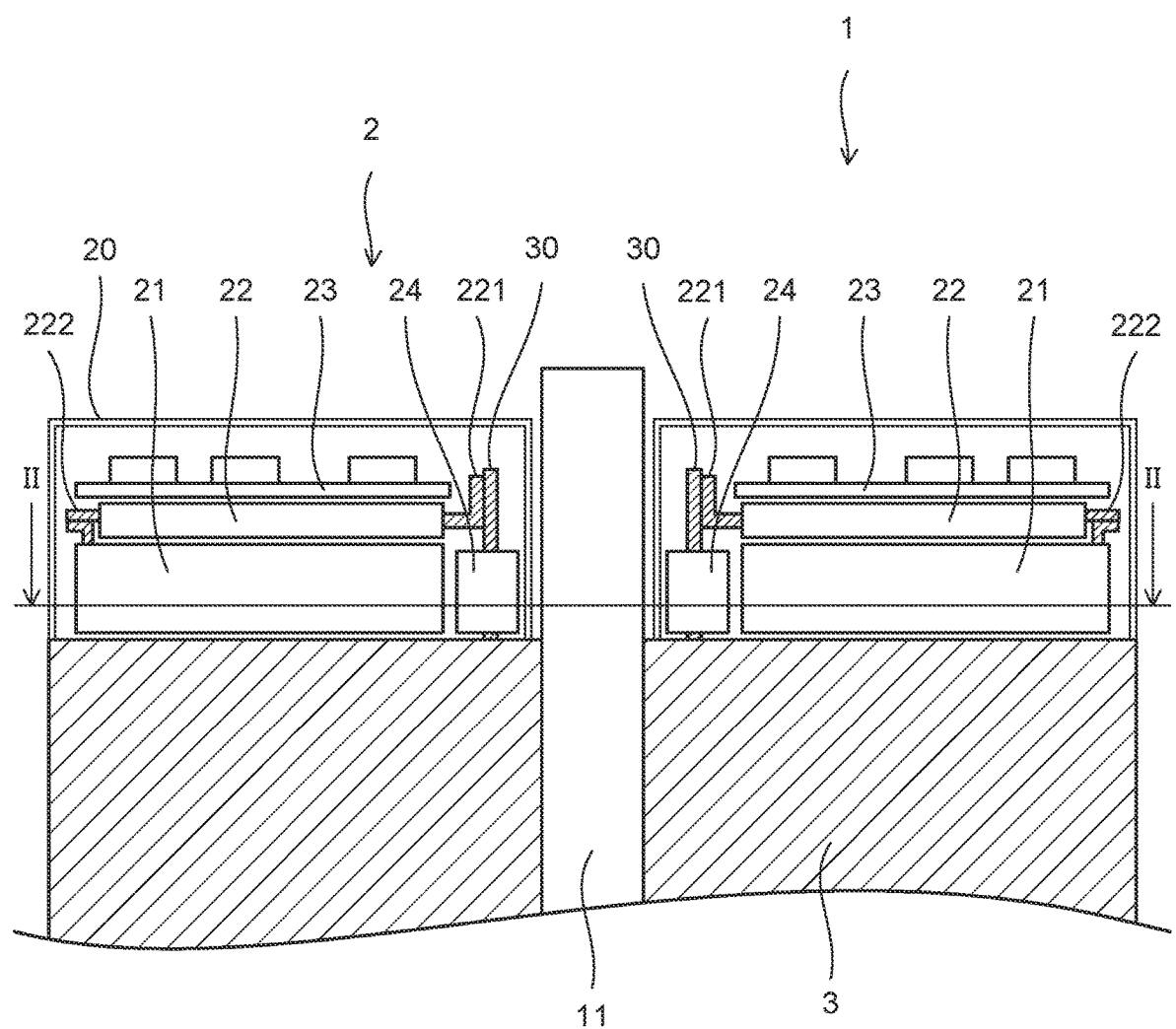
FIG. 1 is a diagram illustrating an inverter-integrated motor according to an embodiment of the present invention.
Figure 2:
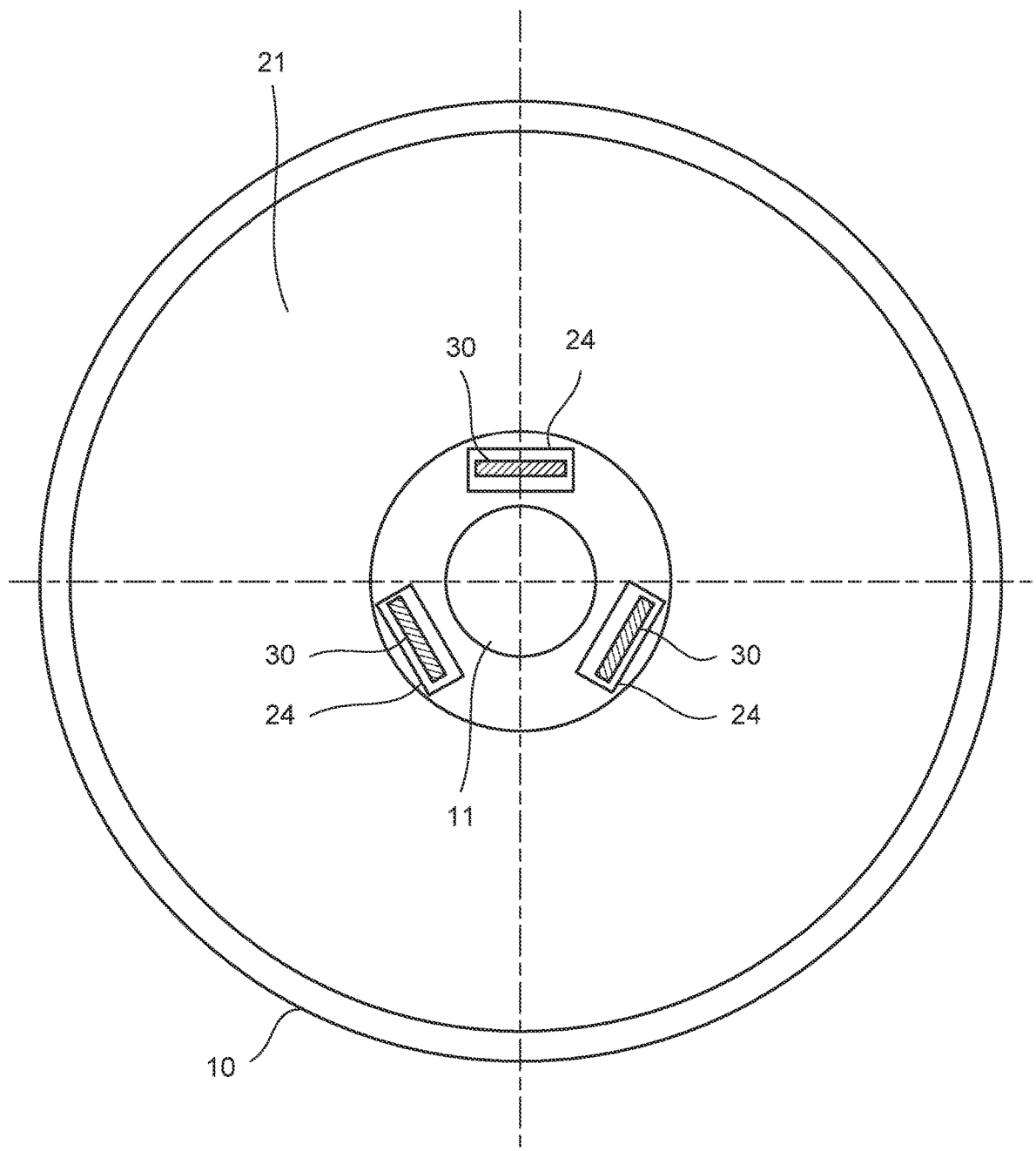
FIG. 2 is a cross-sectional view taken along a line II-II in FIG. 1.

FIGS. 1 and 2 are diagrams illustrating an inverter-integrated motor 1 according to an embodiment of the present invention. FIG. 1 is a cross-sectional view in a rotation shaft direction, and FIG. 2 is a cross-sectional view taken along a line II-II in FIG. 1.

The inverter-integrated motor 1 includes a motor 3 and an inverter unit 2 disposed at an axial end portion (coil end) of the motor 3. The inverter-integrated motor 1 is mounted on, for example, a vehicle, and drives the vehicle by rotation of the motor 3.

The motor 3 includes a rotation shaft 11, and a rotor and a stator (not shown). The motor 3 rotates the rotor by being supplied with electric power from the inverter unit 2, and rotationally drives the rotation shaft 11.

Bus bars 30, which electrically connect the inverter unit 2 and the motor 3, stand and extend in an axial direction at the axial end portion of the motor 3.

The inverter unit 2 converts DC power supplied from a battery (not shown) into AC power, and supplies the AC power to the motor 3 to drive the motor 3. In addition, during deceleration of the vehicle, the battery is charged with regenerated electric power of the motor 3. The inverter unit 2 includes a case 20 and control components (smoothing capacitor 21, power module 22, control board 23, current sensor 24, and the like) accommodated in the case 20.

The case 20 of the inverter unit 2 has a cylindrical outer periphery along an outer periphery of the motor 3. The rotation shaft 11 of the motor 3 passes through an inner peripheral side of the case 20. Therefore, the case 20 is formed in an annular shape (doughnut shape).

The smoothing capacitor 21 smoothes noise and ripples in a direct current to be supplied to the power module 22. The smoothing capacitor 21 is formed by accommodating a plurality of capacitor elements formed of, for example, film capacitors.

The power module 22 converts the DC power supplied from the battery into three-phase high frequency electric power of U, V, and W, and supplies the three-phase high frequency electric power to the motor 3 via the bus bars 30. The power module 22 includes a plurality of switching elements corresponding to each of the three phases. The power module 22 is provided with a cooler such as a heat dissipation fin for cooling the switching elements.

The power module 22 is provided with a motor-side bus bar 221 and a capacitor-side bus bar 222. The motor-side bus bar 221 is coupled to the bus bar 30 of the motor 3 by bolting, welding, or the like, and outputs an AC power to the bus bar 30. The capacitor-side bus bar 222 is coupled to a terminal of the smoothing capacitor 21 by bolting, welding, or the like. The capacitor-side bus bar 222 is also connected to the battery (not shown) and supplied with the DC power.

The control board 23 receives an instruction from a vehicle control unit (not shown), controls an operation of the power module 22 to adjust electric power to be supplied to the motor 3. The control board 23 is electrically connected with the power module 22 and the current sensor 24. The control board 23 acquires a current value in the bus bar 30 acquired by the current sensor 24, and outputs a control signal to the switching elements of the power module 22. A microcomputer and various electric components are mounted on the control board 23.

The current sensor 24 is provided on the bus bar 30, acquires a current value of a current to be supplied to the motor 3, and outputs a signal corresponding to the acquired current value to the control board 23. The current sensor 24 includes, for example, a hall element that detects a current, and the hall element detects a current value of a current flowing through the bus bar 30.

Next, the arrangement of the control components of the inverter-integrated motor 1 configured as described above will be described.

In an inverter-integrated motor in the related art, a bus bar extends in an axial direction from the vicinity of an outer periphery of an end portion of the motor, and the bus bar is provided with a current sensor. With such a configuration, for example, when output of the motor is increased, a control component is increased in size in order to increase withstand voltage and output of an inverter unit, but the radial expansion of the control component is restricted by the bus bar and the current sensor disposed on an outer peripheral side, and thus the control component have to be expanded in a rotation shaft direction.

Therefore, in the related art, due to the increase in the output of the motor, the increase in size of the inverter-integrated motor in the rotation shaft direction cannot be avoided.

On the other hand, in the present embodiment, with a configuration as described below, even when output of the motor 3 is increased, a size can be decreased in the rotation shaft direction.

As shown in FIG. 1, in the motor 3, the bus bars 30 are disposed upright at the axial end portion, that is, on a side at which the inverter unit 2 is disposed. As shown in FIG. 2, there are three bus bars 30 corresponding to three phases of U, V, and W. The bus bars 30 are arranged close to and at equal intervals around the rotation shaft 11, and extend in the axial direction along the rotation shaft 11 from the end portion of the motor 3.

As shown in FIG. 1, current sensors 24 are provided in the vicinity of portions of the bus bars 30 that are drawn out from the motor 3, respectively. Each of the current sensors 24 is disposed along an extending direction of the bus bar 30 so as to surround the bus bar 30, and detects a current value of a current flowing through the bus bar 30. The current sensor 24 is connected to the control board 23 by a harness or the like, and outputs a signal indicating the current value to the control board 23.

The smoothing capacitor 21 is disposed on an outer peripheral side of the bus bars 30 and the current sensors 24. As shown in FIG. 2, the smoothing capacitor 21 has a substantially annular cross section when viewed in the axial direction. The power module 22 and the control board 23 are similarly formed in an annular shape.

As shown in FIG. 1, the inverter unit 2 is disposed by stacking the smoothing capacitor 21, the power module 22, and the control board 23 in this order from the end portion of the motor 3.

The bus bar 30 extending from the end portion of the motor 3 and the current sensor 24 disposed along the bus bar 30 are located in a hollow portion of an inner periphery of the smoothing capacitor 21, the power module 22, and the control board 23.

With such a configuration, the smoothing capacitor 21, the power module 22, and the control board 23, which are control components of the inverter unit 2, are less restricted in size on an outer peripheral side thereof. That is, it is possible to expand the control components to a size that can be accommodated in the case 20 (about an outer diameter of the motor 3).

As described above, since the size of the control components can be increased in the radial direction, the number and the size of the capacitor elements accommodated in the smoothing capacitor 21 can be increased. In the power module 22, the switching elements can be increased in size, and a wiring connected to a power element can be enlarged. Further, the cooler that cools the switching elements can be increased in size. Regarding the control board 23, mounted elements and wirings can also be enlarged.

Accordingly, even when the control components of the inverter unit 2 are increased in size in accordance with the increase in the output of the motor 3, the control components can be expanded in an outer diameter direction, and can be prevented from being expanded in the rotation shaft direction as much as possible.

The embodiment of the present invention described above is applied to the inverter-integrated motor 1 including the inverter unit 2 at the end portion of the motor 3 in a rotation shaft 11 direction. The motor 3 includes the bus bars 30 as conductive members electrically connected to the inverter unit 2. The inverter unit 2 includes the control components that are connected to the bus bars 30 and that control the driving of the motor 3. The bus bars 30 are provided around the rotation shaft 11, adjacent to the rotation shaft 11, and extend along the rotation shaft 11. The control components are disposed on a radially outer side of the bus bar 30.

Accordingly, even when the control components of the inverter unit 2 are increased in size due to the increase of withstand voltage and output in order to increase the output of the motor 3, the control components can be expanded in the radial direction, and thus can be prevented from being expanded in the rotation shaft direction. Therefore, even when the output of the motor 3 is increased, the inverter-integrated motor 1 can be decreased in size in the rotation shaft direction.

In the present embodiment, the current sensor 24 is disposed on the bus bar 30, and the control components including the power module 22 that supplies electric power to the motor 3, the smoothing capacitor 21 that smoothes a current of the power module 22, and the control board 23 that controls the operation of the power module 22, are disposed around the bus bars 30 and the current sensors 24.

Accordingly, the power module 22, the smoothing capacitor 21, and the control board 23, which are control components of the inverter unit 2, are disposed outside the bus bars 30 and the current sensors 24, so that these control components can be expanded in the radial direction.

In the present embodiment, the control components are disposed by stacking the smoothing capacitor 21, the power module 22, and the control board 23 in this order from the end portion of the motor 3.

With such a configuration, the current sensor 24 disposed on the bus bar 30 and the motor-side bus bar 221 of the power module 22 can be disposed so as not to interfere with each other, so that these control components can be expanded in the radial direction.

Next, a modification of the present invention will be described.

Figure 3:
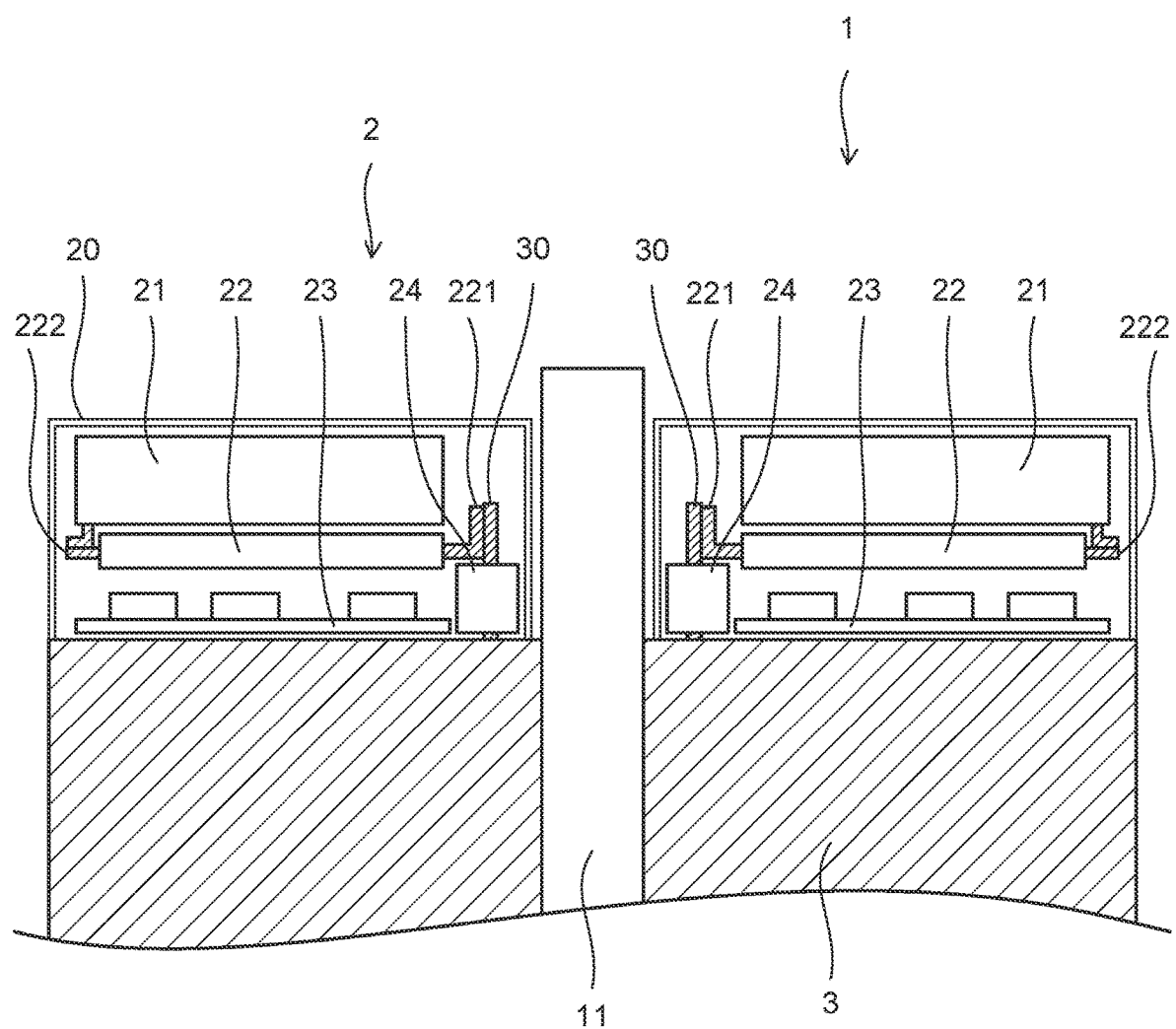
FIG. 3 is a diagram illustrating an inverter-integrated motor according to a modification of the present embodiment.

FIG. 3 is a diagram illustrating the inverter-integrated motor 1 according to the modification of the present invention, and is a cross-sectional view in the rotation shaft direction.

In the modification shown in FIG. 3, an order in which the control components of the inverter unit 2 are stacked is different from that in the configuration described with reference to FIG. 1. Since other configurations are the same as those in FIG. 1, the same reference numerals are given thereto, and the description thereof will be omitted.

As shown in FIG. 3, the inverter unit 2 is disposed by stacking the control board 23, the power module 22, and the smoothing capacitor 21 in this order from the end portion of the motor 3.

With such a configuration, as in the configuration of FIG. 1 described above, the bus bars 30 are disposed on an inner periphery of the inverter unit 2, so that the control components of the inverter unit 2 can also be expanded in the radial direction even when the control components are increased in size due to the increase of the withstand voltage and the output in order to increase the output of the motor 3.

In particular, when the smoothing capacitor 21 is disposed on a side separated from the motor 3, interference with the bus bar 30 can be avoided on an inner periphery of the smoothing capacitor 21, and thus a shape of the smoothing capacitor 21 can be expanded to an inner peripheral side as well.

As shown in FIG. 3, when the control board 23 is close to the motor 3, the control board 23 may be affected by noise caused by driving of the motor 3. In order to prevent this, it is desirable to provide a shielding member that shields electromagnetic waves or the like between the control board 23 and the motor 3.

Figure 4:
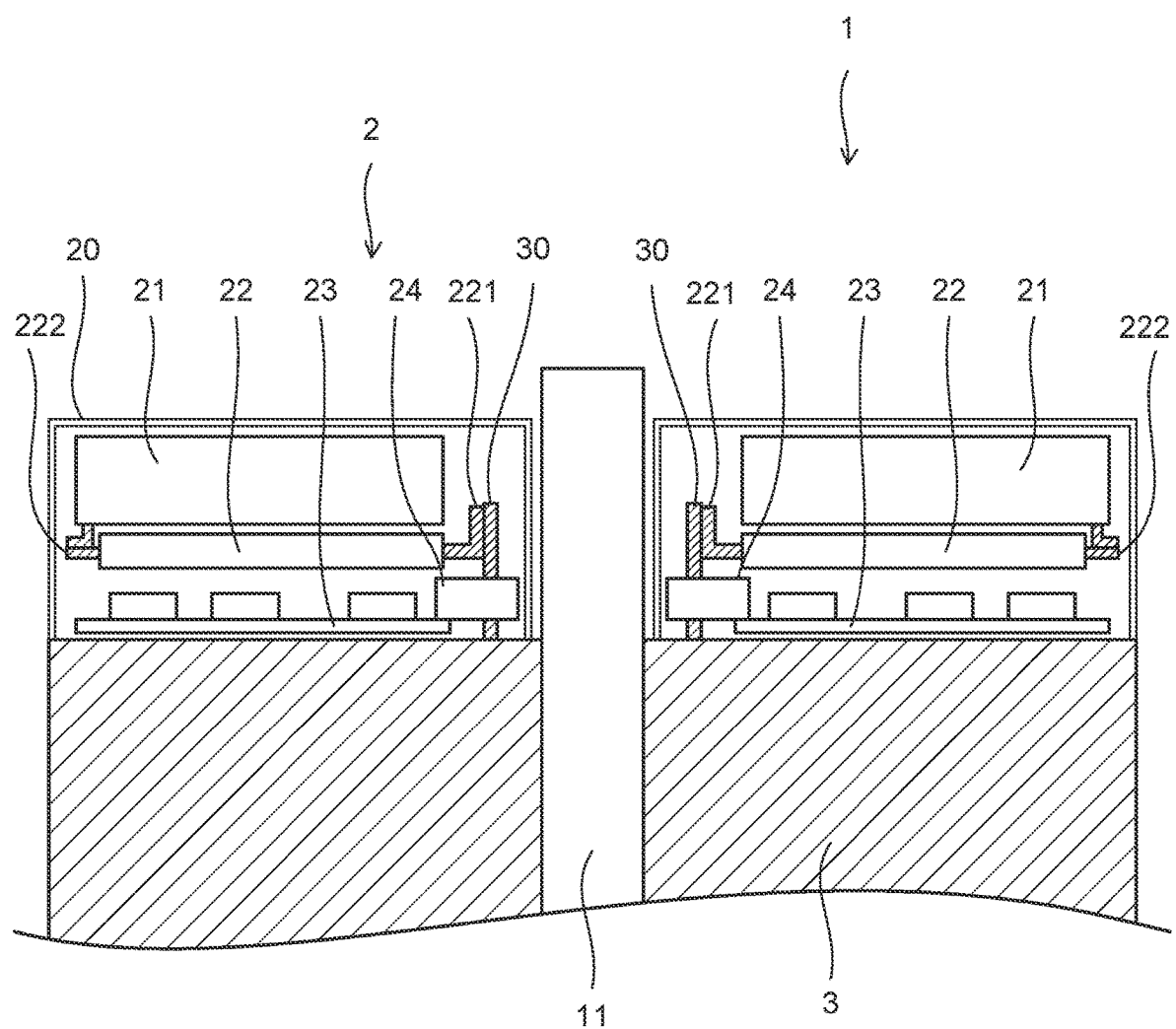
FIG. 4 is a diagram illustrating an inverter-integrated motor according to another modification.

FIG. 4 is a diagram illustrating the inverter-integrated motor 1 according to another modification of the present invention, and is a cross-sectional view in the rotation shaft direction.

In the modification shown in FIG. 4, an order in which the control components of the inverter unit 2 are stacked is different from that in the configuration described with reference to FIG. 1. Since other configurations are the same as those in FIG. 1, the same reference numerals are given thereto, and the description thereof will be omitted.

As shown in FIG. 4, the current sensor 24 is mounted on the control board 23. More specifically, the current sensor 24 is formed such that a hall element that detects a current is accommodated in a case. A terminal extending from the hall element is fixed on the control board 23. That is, the control board 23 is disposed on the radially outer side of the hall element that detects the current.

With such a configuration, in addition to effects of the configuration of FIG. 1 described above, a harness or the like connecting the current sensor 24 and the control board 23 is not necessary, and the number of components and the number of manufacturing steps can be reduced, and thus a manufacturing cost of the inverter-integrated motor 1 can be reduced.

Figure 5:
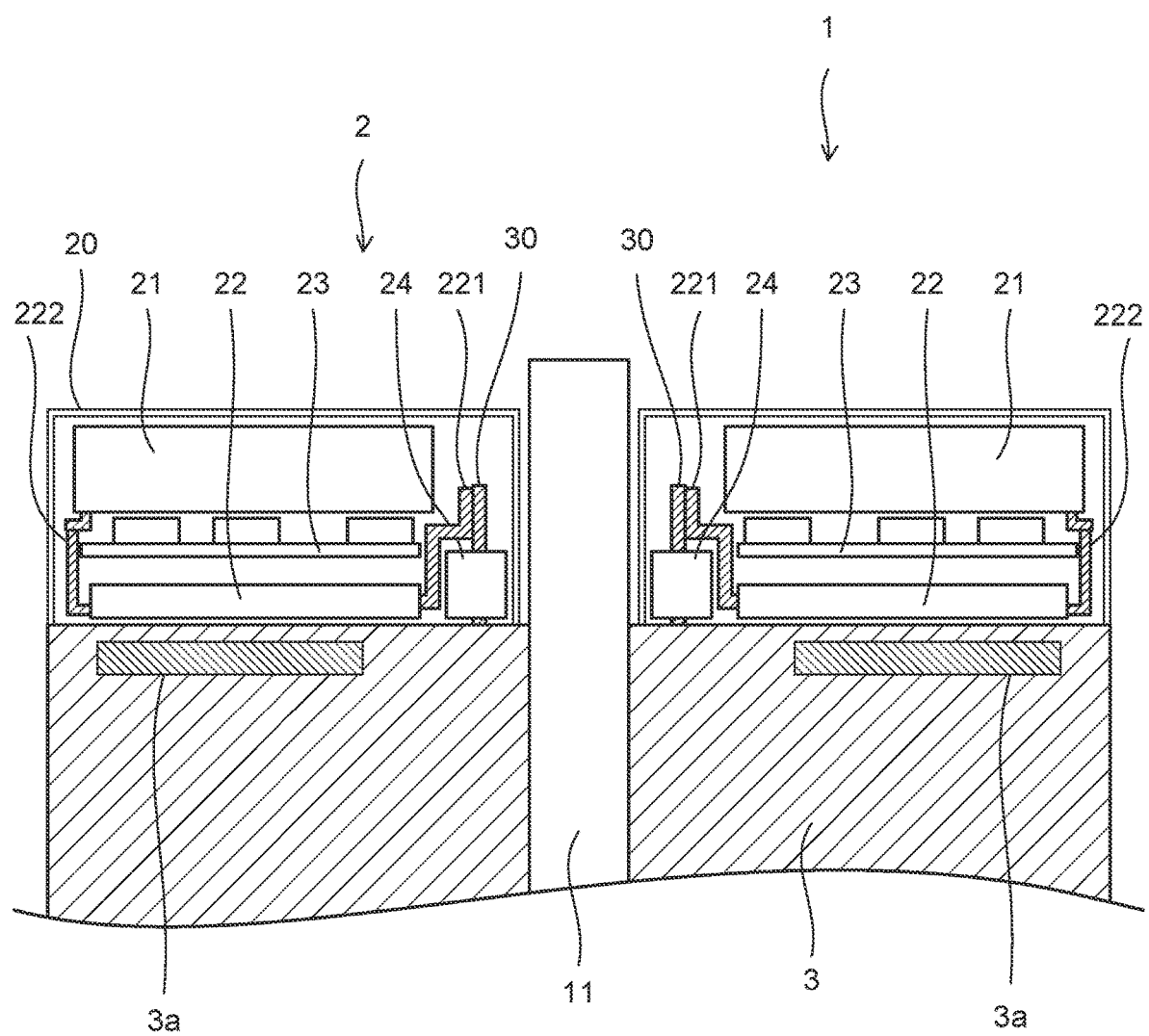
FIG. 5 is a diagram illustrating an inverter-integrated motor according to still another modification.

FIG. 5 is a diagram illustrating the inverter-integrated motor 1 according to still another modification of the present invention, and is a cross-sectional view in the rotation shaft direction.

In the modification shown in FIG. 5, an order in which the control components of the inverter unit 2 are stacked is different from that in the configuration described with reference to FIG. 1. Since other configurations are the same as those in FIG. 1, the same reference numerals are given thereto, and the description thereof will be omitted.

As shown in FIG. 5, the inverter unit 2 is disposed by stacking the power module 22, the control board 23, and the smoothing capacitor 21 in this order from the end portion of the motor 3.

With such a configuration, as in the configuration of FIG. 1 described above, the control components of the inverter unit 2 can be expanded in the radial direction even when the control components are increased in size due to the increase of the withstand voltage and the output in order to increase the output of the motor 3.

In particular, when the power module 22 is brought close to the end portion of the motor 3, the cooling of the power module 22 can be shared with the cooling of the motor 3. Specifically, a housing (or coil end) of the motor 3 is formed with a refrigerant flow path 3a through which a refrigerant flows. Therefore, by bringing the power module 22 and the refrigerant flow path 3a on the end portion side of the motor 3 close to each other, the switching elements of the power module 22 can be cooled by the refrigerant in the refrigerant flow path 3a.

Since a cooling efficiency of the power module 22 can be improved, the power module 22 can have a higher withstand voltage.

Figure 6:
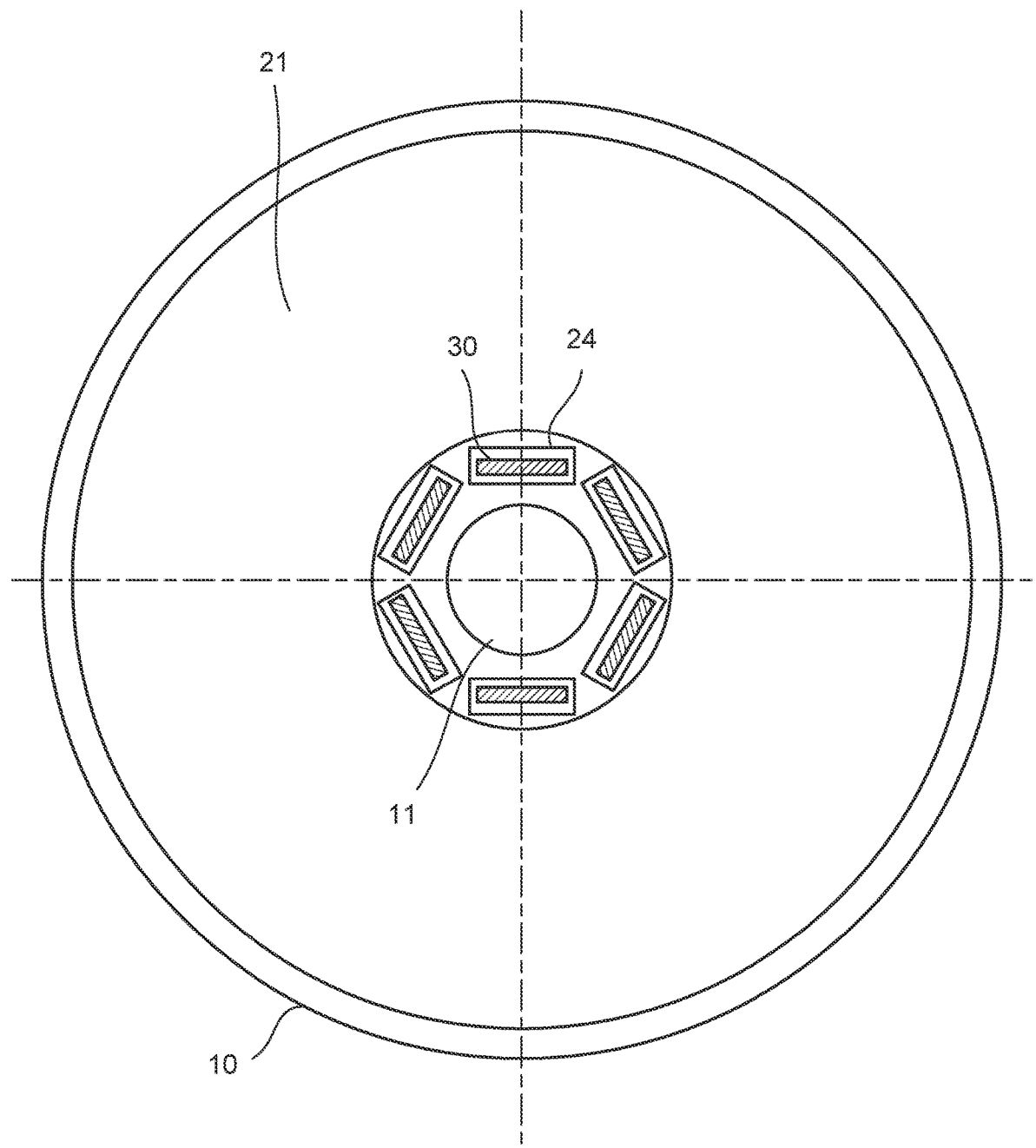
FIG. 6 is a cross-sectional view of an inverter-integrated motor according to still another modification.

FIG. 6 is a diagram illustrating the inverter-integrated motor 1 according to still another modification of the present invention, and is a diagram corresponding to the cross-sectional view taken the line II-II in FIG. 2.

The modification shown in FIG. 6 is a modification of the configurations described with reference to FIGS. 1 to 5, and is different in a configuration of the bus bar 30 protruding from the motor 3. Since other configurations are the same as those in FIG. 2, the same reference numerals are given thereto, and the description thereof will be omitted.

As shown in FIG. 6, the motor 3 includes six bus bars 30. Regarding these bus bars 30, two bus bars 30 are provided for each of the U phase, the V phase, and the W phase. Each bus bar 30 is provided with the current sensor 24. Accordingly, the bus bar 30 can be freely formed in accordance with a configuration of the motor 3.

With such a configuration, as in the configuration of FIG. 2 described above, the bus bars 30 are disposed on the inner periphery of the inverter unit 2, so that the control components of the inverter unit 2 can be expanded in the radial direction even when the control components are increased in size due to the increase of the withstand voltage and the output in order to increase the output of the motor 3.

As described above, embodiments, the above embodiments, and modifications of the present invention are merely examples of applications of the present invention, and the technical scope of the present invention is not limited to the specific configurations of the above embodiments.

In the present embodiment, the current sensor 24 is disposed on the bus bar 30 in the vicinity of the end portion of the motor 3, and the present invention is not limited to this configuration. For example, the current sensor 24 may be disposed on the bus bar 30 at a position separated from the motor 3, and the inner peripheral side of the smoothing capacitor 21 (or another control component) may be close to the bus bar 30 on the end portion side of the motor 3 with respect to the current sensor 24.

The inverter-integrated motor 1 according to the present embodiment may be mounted on an electric vehicle that travels by driving the inverter-integrated motor 1 with electric power of a battery mounted on the vehicle, or may be mounted on a series hybrid vehicle that includes an engine and that drives the inverter-integrated motor 1 with electric power generated by the engine. Alternatively, the inverter-integrated motor 1 may be used as another driving force source.

In the present embodiment, the smoothing capacitor 21, the power module 22, and the control board 23, which are control components of the inverter unit 2, have an annular shape, and the present invention is not limited thereto. As long as the bus bar 30 and the current sensor 24 can be disposed on a radially inner side, the control components may have any shape, and the shape may be a polygon or a combination of a curved surface and a polygon. The control components may have any shape as long as it corresponds to shapes of an element, a wiring, and the like constituting each component.

The invention claimed is:

1. An inverter-integrated motor comprising:
   an inverter unit at an end portion of a motor in a rotation shaft direction, wherein:
   the motor comprises a bus bar electrically connected to the inverter unit, the bus bar being provided with a current sensor,
   the inverter unit comprises a control component connected to the bus bar and configured to control driving of the motor,
   the bus bar is disposed upright from the end portion of the motor and extends along a rotation shaft of the motor in a state of being adjacent to the rotation shaft, and
   the control component is disposed on a radially outer side of the bus bar,
   the control component comprises a smoothing capacitor, a power module, and a control board, each of which have a substantially annular cross section when viewed in the rotation shaft direction, and
   the bus bar and the current sensor are located in a hollow portion at a radial inner side of the smoothing capacitor, the power module, and the control board, where the hollow portion is disposed adjacent to the radial inner side of the smoothing capacitor.

2. The inverter-integrated motor according to claim 1, wherein:
   the power module is configured to supply electric power to the motor, the smoothing capacitor is configured to smooth a current of the power module, and the control board is configured to control an operation of the power module.

3. The inverter-integrated motor according to claim 2, wherein the smoothing capacitor, the power module, and the control board of the control component are stacked, in this order, from the end portion of the motor.

4. The inverter-integrated motor according to claim 2, wherein the control board, the power module, and the smoothing capacitor of the control component are stacked, in this order, from the end portion of the motor.

5. The inverter-integrated motor according to claim 4, wherein the current sensor is mounted on the control board.

6. The inverter-integrated motor according to claim 2, wherein:
   the power module, the control board, and the smoothing capacitor of the control component are stacked, in this order, from the end portion of the motor, and
   the motor is provided with a refrigerant flow path through which a refrigerant flows at a position adjacent to the power module.

* * * * *